United States Patent [19]

Castelain et al.

[11] Patent Number: 4,940,382

[45] Date of Patent: Jul. 10, 1990

[54] AUTONOMOUS MOVING BODY FOR TRANSPORTING A TOOL AT A CONSTANT SPEED

[75] Inventors: Yves Castelain, L'Isle Jourdain; Philippe Jaubert, Cologne; René Peltier, Colomiers, all of France

[73] Assignee: Aerospatiale Societe Nationale Industrielle, Paris, France

[21] Appl. No.: 289,206

[22] Filed: Dec. 23, 1988

[30] Foreign Application Priority Data

Dec. 31, 1987 [FR] France ................ 87 18478

[51] Int. Cl.[5] ............................... B25J 5/00
[52] U.S. Cl. ................ 414/750; 74/665 GE; 180/8.5; 901/1; 114/222
[58] Field of Search ................ 414/750–753; 901/1; 180/8.5, 8.1; 114/222; 74/665 GE; 192/48.1, 48.2

[56] References Cited

U.S. PATENT DOCUMENTS 4,674,949 6/1987 Kroczynski ............ 414/750

FOREIGN PATENT DOCUMENTS 0084012 7/1983 European Pat. Off. .
2151671 7/1985 United Kingdom .

Primary Examiner—David A. Bucci
Assistant Examiner—Donald W. Underwood
Attorney, Agent, or Firm—Pearne, Gordon, McCoy & Granger

[57] ABSTRACT

In order to displace a working tool at a constant speed over a surface having a random shape and orientation, particularly for cleaning, pumicing, painting or decorating the outer surface of an aircraft, an autonomous moving body with a special design is used. This moving body comprises two attachment assemblies (10,12) each equipped with attachment members (30,48) which can be moved towards and away from the surface, and a tool holder assembly (14), said three assemblies being able to move with respect to the surface in a given direction. Control means supported by the tool holder assembly (14) ensure both the advance at a constant speed of said assembly with respect to the attachment assembly (10,12) fixed to the surface and the advance in the same direction and at a higher speed of the other attachment assembly, the two attachment assemblies (10,12) being in turn fixed to the surface without stopping the tool holder assembly (14).

9 Claims, 4 Drawing Sheets

AUTONOMOUS MOVING BODY FOR TRANSPORTING A TOOL AT A CONSTANT SPEED

DESCRIPTION

The invention relates to an autonomous moving body able to move a working tool at a constant speed over a surface having a random shape and orientation. It has been designed and developed by the Production Research Department of Aerospatiale, Toulouse, with the aid of "Junior Entreprise" of the Ecole Nationale Superieure d'Ingenieurs de Constructions Aeronautiques (Industrial Projects).

Such a moving body can advantageously be used for carrying out different types of work, such as cleaning, pumicing, painting or decorating the outer surface of an aircraft. However, this application is not limitative and it is readily apparent that a moving body of this type can be used in other industrial fields whenever the performance of a task on a planar or curved surface with a random orientation makes it necessary to move a tool at a constant speed parallel to said surface, whilst maintaining substantially constant the distance separating the tool and the surface.

Throughout the present text the work "tool" is to be understood in its widest sense, i.e. it can relate both to a mechanical tool, such as a pumicing tool, a device carrying out a physical or chemical surface treatment, such as a device for degreasing with the aid of solvents, a paint spray gun, etc.

At present, the operations carried out on the outer surfaces of aircraft prior to their delivery are generally carried out manually. Thus, the personnel allocated to such tasks manually successively carries out the degreasing of the surfaces, pumicing and finishing up by painting.

At present, such work is of a polluting, difficult and fastidious nature for the staff. Moreover, the duration of these manual finishing operations is relatively long and increases the delivery dates given for aircraft.

Hitherto there has been no apparatus able to replace man in connection with this task. Thus, such an apparatus would have to satisfy numerous requirements liked on the one hand with the very variable character of the shape and orientation of the surface and on the other hand with the working conditions of the tool. Thus, in order that the tool can work under satisfactory conditions, it must move at an approximately constant distance from the surface and in particular at a constant speed parallel to said surface. Preferably a change of orientation of the trajectory or path of the tool must be possible without its speed of movement being modified.

The present invention specifically relates to an autonomous moving body having a tool holder designed to move at a constant speed parallel to the surface and independently of the displacement speed of other elements of the moving body, in such a way that the tool can carry out the aforementioned tasks in an autonomous manner, which significantly improves the working conditions and reduces the time necessary for carrying out such tasks.

According to the invention this result is obtained by means of an autonomous moving body able to move a working tool at a constant speed over a surface having a random shape and orientation, characterized in that it comprises:

two attachment assemblies cooperating with one another by guidance means authorizing a relative displacement between said assemblies in a given direction, each of the attachment assemblies carrying attachment members able to adhere to the said surface and means for displacing these attachment members on moving towards and away from said surface;

a tool holder assembly supported by at least one of the attachment assemblies and cooperating with the latter by guidance means authorizing its displacement in said direction; and control means, whose operation ensures the passage of the moving body into two successive and repetitive displacement states; a first of these states, in which the attachment members of only one of the attachment assemblies and said to be fixed, adheres to the said surface and ensures a simultaneous displacement of the tool holder assembly and the other attachment assembly, said to be mobile in the said direction and respectively at a relatively low speed and a relatively high speed; the second state making it possible to interchange the fixed and mobile attachment assemblies of the first state, ensuring a relative immobilization of the two attachment assemblies and the displacement of the tool holder assembly in said direction and at said relatively low speed with respect to the attachment assemblies.

In a thus designed moving body, the tool holder and consequently the tool always travel in the same direction and a constant speed corresponding to said relatively low speed, whereas the rest of the moving body moves by repetition, one of the attachment assemblies being projected forwards at a higher speed than the displacement speed of the tool holder, when the attachment members of the other attachment assembly adhere to the surface and vice versa. As a result of the "second operating state", the function of the two attachment assemblies is interchanged without any interruption to the constant speed advance of the tool holder.

Preferably, in order that the length of the moving body is reduced to the minimum, the relatively high speed at which the attachment assemblies are in turn projected forwards is at least equal to twice the relatively low constant speed at which the tool holder moves.

According to a preferred embodiment of the invention the control means comprise a single motor member carried by the tool holder assembly, said motor member actuating, respectively via four clutches, a first drive means ensuring a relative displacement at said relatively low speed between a first of the attachment assemblies and the tool holder assembly, a second drive means ensuring a relative displacement at said relatively high speed between the first attachment assembly and the tool holder assembly, a third drive means ensuring a relative displacement at said relatively low speed between the second attachment assembly and the tool holder assembly and a fourth drive means ensuring a relative displacement at said relatively high speed between the second attachment assembly and the tool holder assembly, the displacements controlled by the second and fourth drive means taking place in opposite directions compared with the displacements controlled by the first and third drive means.

The first and second drive means can comprise two opposite racks carried by the first attachment assembly in accordance with said direction, and a first and a second pinions mounted on the tool holder assembly and respectively geared on the opposite racks, the third and fourth drive means incorporating two other opposite racks, carried by the second attachment assembly in accordance with said direction and a third and a fourth pinions mounted on the tool holder assembly and respectively geared on said other opposite racks, the motor member driving these four pinions at the same speed and in the same direction by movement transmission means incorporating the four clutches.

In this case, the transmission means e.g. comprise at least one belt driven by the motor member and passing over four pulleys supported by the tool holder assembly and whereof the spindles respectively drive the said pinions by means of the four clutches.

According to another aspect of the invention, in order to permit a change of orientation of the trajectory of the tool, the second attachment assembly has a part moving in said direction with respect to the first attachment assembly and a rotary part able to rotate with respect to the moving part about an axis perpendicular to the said direction and to the said surface, means being provided for controlling a relative rotation between these moving and rotary parts about said axis, said attachment members being supported by the rotary part. It should be noted that the orientation change of the trajectory obtained by a relative rotation between the mobile and rotary parts of the second attachment assembly has no affect on the displacement speed of the tool relative to the surface, which remains constant.

These means for controlling the relative rotation can in particular comprise a motor member carried by the said moving part, a pinion driven by said motor member and a circular rack centered on the said axis and carried by the said rotary part on which is geared the pinion carried by the moving part.

An embodiment of the invention is described in greater detail hereinafter relative to the drawings, wherein show:

DESCRIPTION OF THE PREFERRED EMBODIMENT

Figure 1:
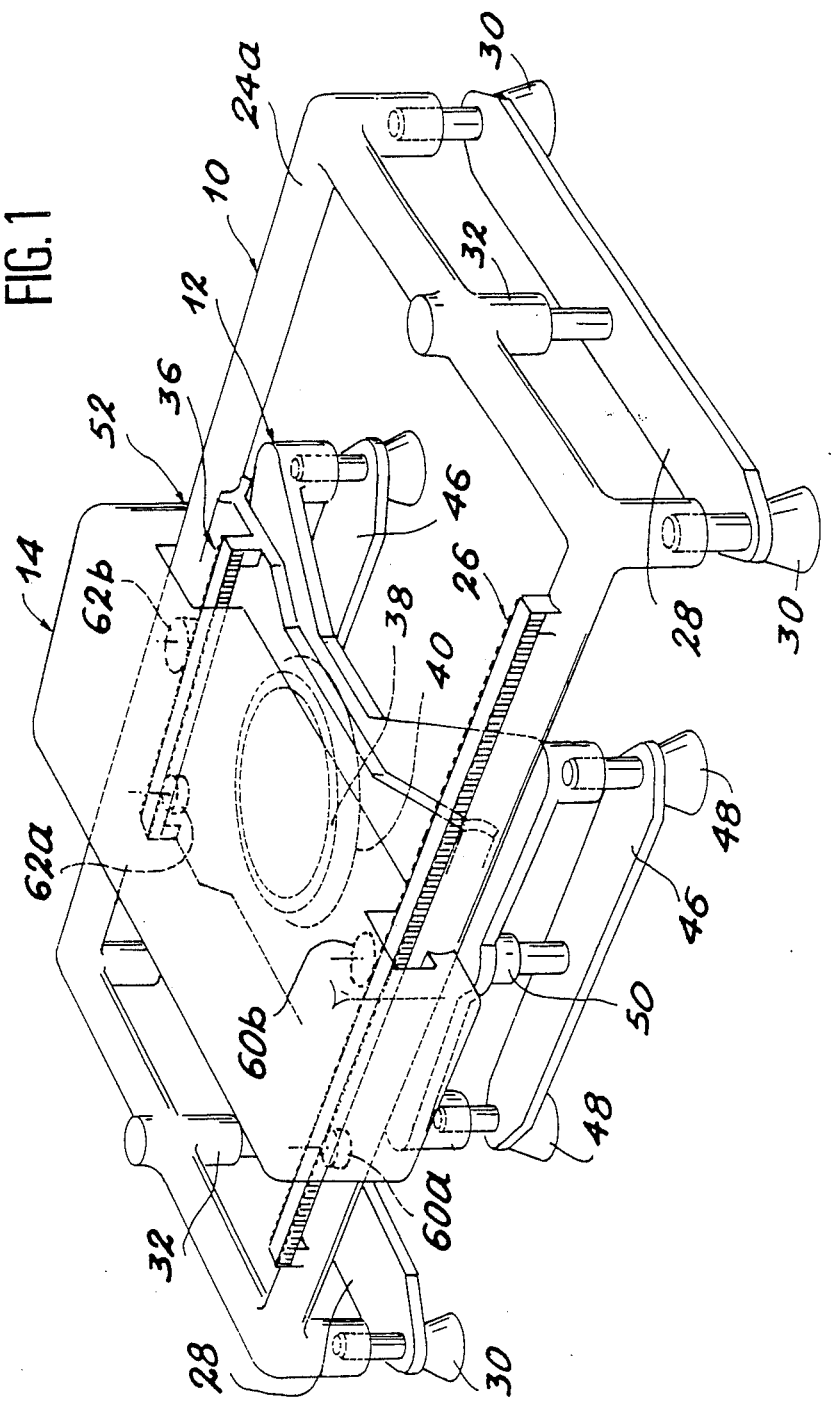
FIG. 1 a perspective view diagrammatically showing an autonomous moving body according to the invention.
Figure 2:
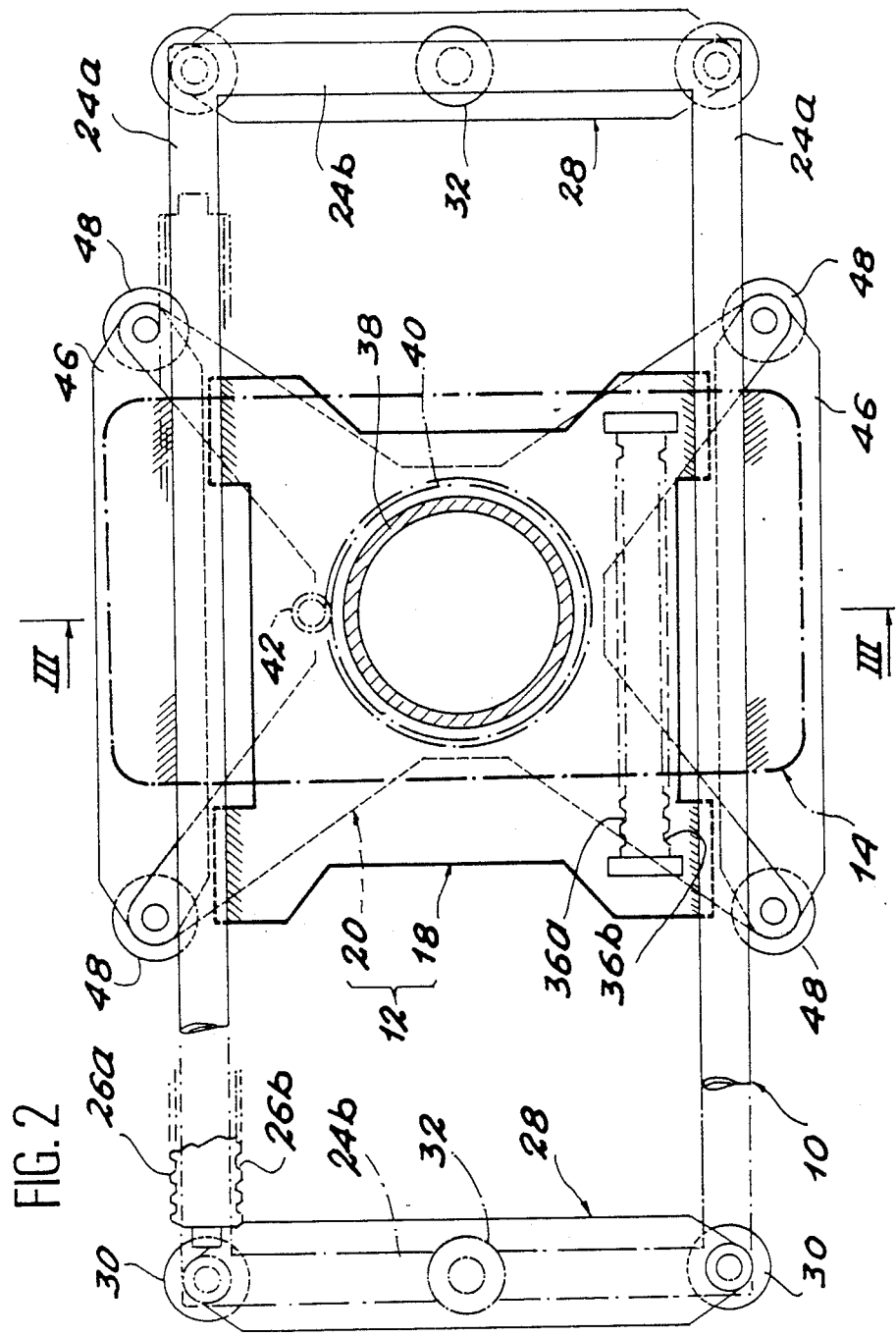
FIG. 2 a plan view of the moving body of FIG. 1.
Figure 3:
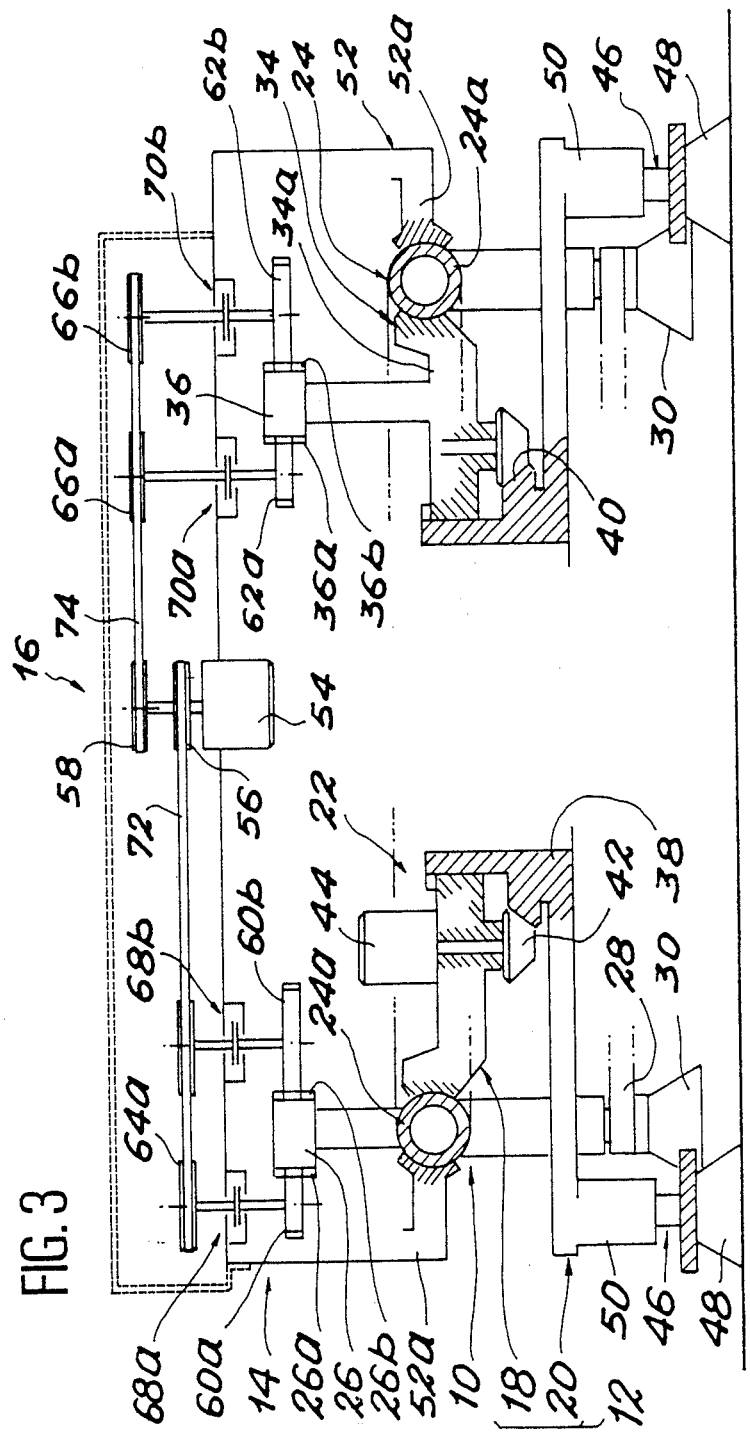
FIG. 3 a cross-sectional view along line III—III of FIG. 2.

As illustrated in FIGS. 1 to 3, the autonomous moving body according to the invention mainly comprises three separate assemblies, respectively designated by the general references 10, 12 and 14.

Assemblies 10 and 12 respectively constitute a first attachment assembly and a second attachment assembly. They are designed so that they can be attached or adhered in turn to the surface on which it is wished to perform a task. They also have a relative degree of freedom in a given direction, which is approximately parallel to the surface when at least one of them is attached to the latter. This configuration permits a displacement of the moving body on the surface in said direction, by repetition, as will be shown hereinafter.

The third assembly 14 is a tool holder assembly. It is slidingly supported by the first attachment assembly 10 parallel to the aforementioned direction. The tool holder assembly 14 supports the control means of the moving body, designated by reference 16. These control means simultaneously ensure, according to an essential feature of the invention, the displacement of the moving body by repetition of the assemblies 10 and 12 and the displacement at a constant speed of the tool holder assembly 14 in the aforementioned direction.

In the represented embodiment, the moving body also has means making it possible to change the orientation of its trajectory by modifying the orientation of the aforementioned direction with respect to the surface. To this end, the second attachment assembly 12 comprises a part 18 supported by the first attachment assembly 10 and moving in said direction with respect to said assembly, as well as a part 20 mounted in rotary manner on part 18 about an axis perpendicular to said direction and to the surface. The attachment of the second attachment assembly to the surface takes place by its rotary part 20. The relative rotation between parts 18 and 20 is assured by control means 22.

A more precise description of the different elements of the autonomous moving body shown in the drawings will now be given.

The first attachment assembly 10 mainly comprises a rigid rectangular frame 24, e.g. made from metal or a composite material. The two large sides 24a of the frame 24 form slides for supporting and guiding the second attachment assembly 12 and the tool holder assembly 14 in said direction. This advance direction of the moving body and displacement direction of the tool (not shown) supported by assembly 14 is consequently parallel to sides 24a of frame 24.

Two opposites racks 26a, 26b formed on a rod 26 thus constituting a double rack are fixed to frame 24. More precisely rod 26 and racks 26a, 26b are oriented parallel to the large sides 24a of frame 24 in the aforementioned direction.

Each of the small sides 24b of frame 24 supports a foot 28 able to move in a direction perpendicular to the plane of frame 24 with respect to the latter. Feet 28 are located on the same side of the plane formed by frame 24 and serve to come into contact with the working surface by attachment members 30, such as electromagnetically, pneumatically or hydraulically operated suction cups. The displacement of each of the feet 28 relative to frame 24 is controlled by a jack 32 carried by frame 24 and e.g. guided by rods integral with feet 28 and extending perpendicular to the plane of frame 24 through passages formed for this purpose in the small sides 24b of frame 24.

Part of the second attachment assembly 12, which is supported by the first attachment assembly 10 so as to be able to slide in said direction, also comprises a rigid rectangular frame 34, which is e.g. made from metal or a composite material. Two parallel, opposite sides 34a of frame 34 are located parallel to the large sides 24a of frame 24, so as to slide on the inner surfaces of the slides formed by the said large sides 24a. The length of the sides 34a of frame 34 is much less than that of the length of sides 24a of frame 24, so as to define between the attachment assemblies 10 and 12 a relatively large travel in said direction, so that the interchange of the attachment of these assemblies on the surface occurs as infrequently as possible.

Two opposite racks 36a, 36b formed on a rod 36 thus constituting a double rack are fixed to frame 34. More precisely, rod 36 and racks 36a and 36b are oriented parallel to sides 34a of frame 34 in the aforementioned direction. Moreover, rods 26 and 36 are disposed approximately at the same level with respect to the plane of frames 24 and 34 and on either side of the plane of symmetry of the large sides 24a of frame 24.

Part 20 of the second attachment assembly 12 is connected in pivoting manner to part 18 about an axis passing through center of frame 34 and oriented perpendicular to the plane of said frame.

Said rotary part 20 comprises a rigid circular frame 38, e.g. made from metal or a composite material, which is centered on the aforementioned rotation axis. The pivoting connection between parts 18 and 20 is provided by any appropriate means, such as a group of rollers carried by the rectangular frame 34 and with which cooperates by its outer periphery the circular frame 38.

A circular rack 40, also centered on the rotation axis of part 20, is formed on the circular frame 38. On said rack 40 gears a pinion 42, whose axis parallel to the rotation axis of part 20 is supported by part 18 and rotated by a motor member carried by part 18 and constituted in the represented embodiment by a geared motor 44. The latter forms together with the pinion 42 and rack 40, the means 22 for controlling the relative rotation between parts 18 and 20 of the second attachment assembly 12.

In two diametrically opposite locations and normally located on the sides of the moving body with respect to its displacement direction, circular frame 38 supports two feet 46 able to move in a direction perpendicular to the plane of frame 38 with respect to the latter. Feet 46 are mounted on frame 38 on the same side as feet 28, so as to be able to come into contact with the working surface by attachment members 48, such as electromagnetic, pneumatic or hydraulic suction cups. The displacement of each of the feet 46 with respect to frame 38 is controlled by a jack 50 carried by frame 38 and e.g. guided by rods integral with feet 46 and located perpendicularly with respect to the plane of frame 38 through passages formed for this purpose in frame 38.

The tool holder assembly 14 also comprises a rigid rectangular frame 52, e.g. made from metal or a composite material. Two parallel, opposite sides 52a of frame 52 are arranged parallel to the large sides 24a of frame 24, so as to slide on the outer surfaces of the slides formed by these large sides 24a. The length of sides 52a is much less than the length of sides 24a, so as to define between the tool holder assembly 14 and the first attachment assembly, an adequate relative travel in the aforementioned direction to enable the tool holder assembly to move at a constant speed on assembly 10 throughout the duration of the attachment of the latter to the working surface. The tool holder assembly 14 is designed so as to support one or more not shown tools making it possible to work the said surface. For this purpose, appropriate, now shown support means are provided.

Figure 4:
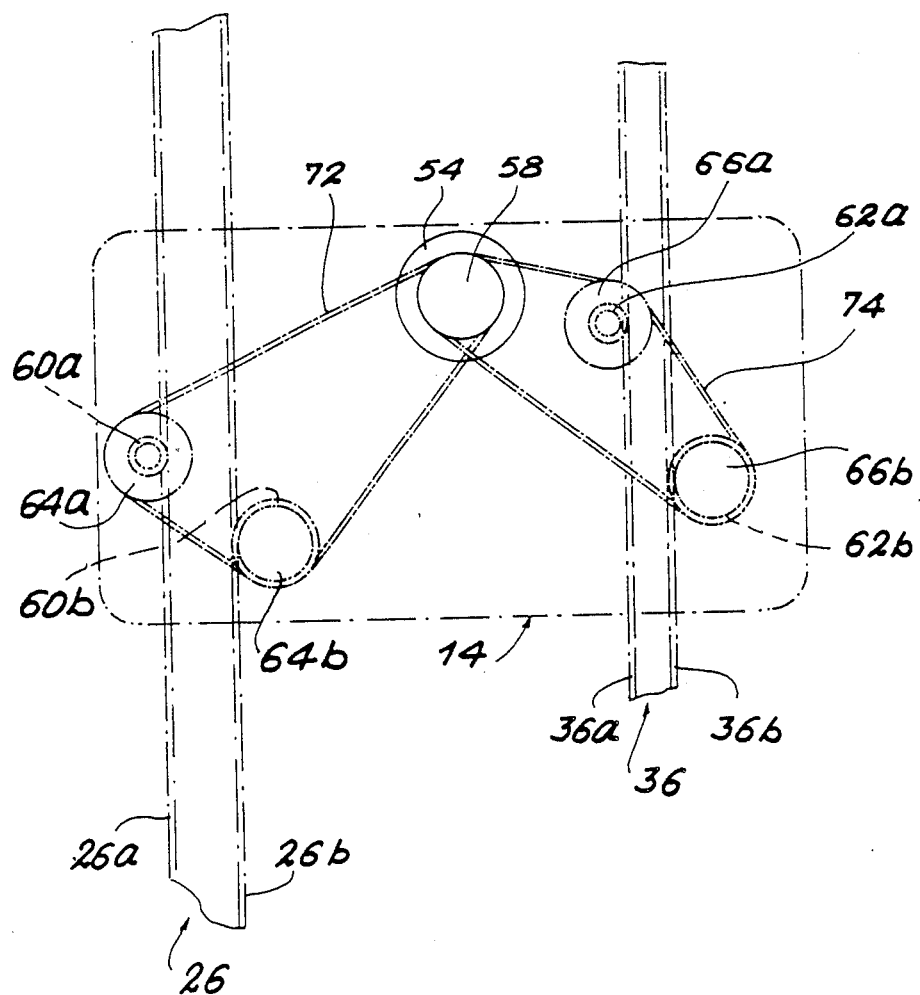
FIG. 4 a plan view showing on a larger scale the arrangement of the belts and pulleys carried by the tool holder assembly and used for controlling the displacements of said assembly, as well as the displacements of the moving body with respect to the surface.

Control means 16 supported by the tool holder assembly 14 and making it possible to control both the displacement of the moving body on the surface and the displacement at a constant speed of assembly 14 parallel to said surface will now be described relative to FIGS. 3 and 4.

These control means 16 incorporate a motor member carried by frame 52 and constituted in the represented embodiment by a geared motor 54. The output shaft of the geared motor 54, which is oriented perpendicular to the plane of frame 52 and located in the plane of symmetry of the large sides 24a of frame 24, which coincides with the longitudinal plane of symmetry of the moving body, carries two notched pulleys 56 and 58.

Frame 52 of the tool holder assembly 14 also supports the spindles, oriented perpendicular to the plane of frame 52, of four pinions 60a, 60b, 62a and 62b. The arrangement of these pinions on frame 52 is such that pinions 60a and 60b are respectively geared on the opposing racks 26a, 26b of the first attachment assembly 10 and pinions 62a and 62b are respectively geared on the opposing racks 36a, 36b of part 18 of th second attachment assembly 12. As the teeth of racks 26a, 26b, 36a and 36b are identical, the pinions 60a, 62a which are respectively geared on rack 26a turn towards the outside of frame 24 and on rack 36a turn towards the inside of frame 24 have identical diameters, which are relatively small compared with the diameters of the also identical pinions 60b, 62b.

The spindle of each of the pinions 60a, 60b, 62a, 62b is rotated by a notched pulley 64a, 64b, 66a, 66b respectively via a clutch 68a, 68b, 70a, 70b. These clutches can be of any known type and in particular electro magnetic, pneumatic of hydraulic.

The notched pulleys 56, 64a, 64b are located in the same plane parallel to the plane of frame 52 and they are operatively connected by a notched belt 72, whose arrangement is such that a rotation in one direction of pulley 56 leads to a rotation in the same direction of pulleys 64a and 64b.

In a comparable manner, notched pulleys 58, 66a and 66b are disposed in the same plane slightly displaced with respect to that of pulleys 56, 64a and 64b. A notched belt 74 also operatively connects pulleys 58, 66a and 66b, in such a way that a rotation in one direction of pulley 58 leads to a rotation in the same direction of pulleys 66a and 66b. In the represented arrangement, pulleys 56, 58, 64a, 64b, 66a and 66b are all identical.

The control of the autonomous moving body brought about in this way can be completely programmed beforehand, or can be carried out remotely by an operator. Preferably, said control is semiautomatic, i.e. the displacement of the moving body in accordance with a rectilinear trajectory takes place automatically, whereas the operator intervenes to control the starting, stopping and change of trajectory.

The different phases of the movements ensuring both the displacement of the moving body in accordance with a rectilinear trajectory and the displacement of the tool holder assembly at a constant speed along same trajectory will now be described.

It is assumed that the moving body is in an initial position, in which the attachment members 30 of the first attachment assembly 10 are activated and remote from frame 24 under the action of jacks 32. However, the attachment members 48 of the second attachment assembly 12 are deactivated and close to frame 38 under the action of jacks 50. The moving body is then fixed to the surface by attachment members 30 of assembly 10. Under these conditions, clutches 68a and 70b are engaged, whereas clutches 68b and 70a are disengaged. The geared motor 54 is then actuated so as to rotate in the same direction and at constant speed the pulleys 56 and 58. It should be noted that this actuation continues in this first state until the moving body stops.

Bearing in mind the position occupied by the different clutches, only the small pinion 60a geared on rack 26a of the first attachment assembly 10 and the large pinion 62b geared on rack 36b of the second attachment assembly 12 are driven in rotation in the same direction and at the same speed. Therefore the tool holder assembly 14 moves at a relatively low speed and in a given direction with respect to the first attachment assembly 10 and the second attachment assembly 12 moves in the same direction and at a higher speed with respect to the tool holder assembly 14. On considering the displacement of the second attachment assembly 12 relative to the first assembly 10, which at this instant constitutes the only immobile part of the moving body, it consequently takes place in the same direction as the tool holder assembly 14 and at a speed more than twice the displacement speed of said latter assembly.

This displacement continues in this way until the second attachment assembly 12 arrives at the end of its travel with respect to the first attachment assembly 10. This situation can be detected by a not shown microcontact. It should be noted that the tool holder assembly 14 is not then at the end of its travel with respect to the first attachment assembly 10. Its displacement in the same direction and at the same relatively low speed compared with the first attachment assembly 10 therefore continues, the clutch 68a remaining engaged and clutch 68b disengaged.

Under the aforementioned end of travel conditions, a second state occurs wherein clutch 70b is disengaged and clutch 70a engaged. Consequently the small pinion 62a is in turn rotated at the same speed and in the same direction as pinion 60a. Therefore the displacement direction of the second attachment assembly 12 compared with the tool holder assembly 14 is reversed and the displacement speed is equal to the displacement speed of the tool holder assembly 14 with respect to the first attachment assembly 10. Therefore the second attachment assembly 12 is immobile with respect to the latter, which is still fixed to the surface.

Jacks 50 are then put into operation to bring the attachment members 48 into contact with the surface. The members 48 are then activated, so that the second attachment assembly 12 is in turn fixed to the surface.

Under these conditions, the attachment members 30 of the first attachment assembly 10 are deactivated and jacks 32 are actuated to clear members 30 on moving away from the surface. The temporary phase or second state making it possible to interchange the two attachment assemblies is then finished.

A new displacement phase or new first state comparable to the first and in which the functions of the two attachment assemblies are reversed then takes place.

In order to start this new phase, clutch 68a is disengaged and clutch 68b engaged. The first attachment assembly 10 consequently moves at a relatively high speed in the same direction and in the same sense as the tool holder assembly 14, with continues to move at a relatively low speed with respect to the surface, under the effect of the gearing of the first pinion 62a on rack 36a carried by the second attachment assembly 12, which is then immobile with respect to the surface. The first attachment assembly 10 moves in the same sense as the tool holder assembly 14 and at a speed more than twice the displacement speed of the latter assembly.

When the first assembly arrives at the end of its travel, clutch 68b is disengaged and clutch 68a engaged, so that the first assembly is immobilized with respect to the surface. A new temporary phase making it possible to interchange the two attachment assemblies is then carried out.

The advance of the moving body in accordance with a rectilinear trajectory is thus assured by a succession of advance phases during which each of the attachment assemblies is in turn fixed to the surface whilst the other attachment assembly is projected forwards, and temporary phases during which the interchange of the two attachment assemblies takes place and both assemblies are then stationary with respect to the surface.

During this advance and in accordance with an essential feature of the invention, the tool holder assembly moves in accordance with the same trajectory and at a constant speed with respect to the surface. This result is obtained by the fact that the tool holder assembly is permanently driven by at least one of the small pinions 60a, 62a, which are engaged on racks 26a or 36a of attachment assembly 10 or 12, which is stationary with respect to the surface.

When it is wished to change the orientation of the trajectory of the moving body and consequently the tool, during the moving body advance phase, during which the first attachment assembly 10 is fixed to the surface, a rotation of part 20 of the second attachment assembly 12 takes place. This rotation, controlled by the actuation of geared motor 44 is carried out in the sense and with the amplitude which it is wished to give to the orientation change.

Following the temporary phase and during the succeeding advance phase, the moving body is fixed to the surface by part 20 of the second attachment assembly 12. Using the geared motor 44, a rotation is brought about in the reverse direction and by the same amplitude of the assembly formed by part 18 of the second attachment assembly 12, the tool holder assembly 14 and the first attachment assembly 10. The modification of the trajectory is then assured, without there being any change to the configuration of the moving body and without any change to the displacement speed of the tool holder assembly relative to the surface.

It should be noted that the possibility of modifying the orientation of the trajectory of the moving body and consequently the tool is optional. Therefore parts 18 and 20 can be replaced by a single part having feet 46 and having a single translation movement along slides formed by the large sides 24a of frame 24.

Moreover, the control means 16 described hereinbefore can be replaced by any means fulfilling the same functions. Thus, the pinion-rack systems can be replaced by belt-pulley systems driven via clutches. Moreover, the driving speed difference between the tool holder assembly and the attachment assemblies can be obtained not by using pinions of different diameters, but by using pulleys of different diameters, racks with different tooth systems, etc.

We claim:

1. Autonomous moving body able to move a working tool at a constant speed over a surface having a random shape and orientation, characterized in that it comprises:
    two attachment assemblies cooperating with one another by guidance means authorizing a relative displacement between said assemblies in a given direction, each of the attachment assemblies carrying attachment members able to adhere to the said surface and means for displacing these attachment members for moving towards and away from said surface;

a tool holder assembly supported by at least one of the attachment assemblies and cooperating with the latter through guidance means authorizing its displacement in said direction; and control means, whose operation ensures the passage of the moving body into two successive and repetitive displacement states; a first of these states, in which the attachment members of only one of the attachment assemblies, said to be fixed, adhere to the said surface, ensuring a displacement of the tool holder assembly and the other attachment assembly, said to be mobile, in the said direction and respectively at a relatively low speed and a relatively high speed; the second state, in which the attachment members of the two attachment assemblies adhere to the said surface, ensuring a displacement of the tool holder assembly in said direction and at said relatively low speed with respect to the attachment assemblies; the fixed and mobile attachment assemblies of two successive first states separated by a second state being interchanged.

2. Autonomous moving body according to claim 1, wherein the control means are such that the relatively high speed is at least equal to twice the relatively low speed.

3. Autonomous moving body according to claim 1, wherein the control means comprise a single motor member carried by the tool holder assembly, said motor member actuating, respectively via four clutches, a first drive means ensuring a relative displacement at said relatively low speed between a first of the attachment assemblies and the tool holder assembly, a second drive means ensuring a relative displacement at said relatively high speed between the first attachment assembly and the tool holder assembly, a second drive means ensuring a relative displacement at said relatively high speed between the first attachment assembly and the tool holder assembly, a third drive means ensuring a relative displacement at said relatively low speed between the second attachment assembly and the tool holder assembly and a fourth drive means ensuring a relative displacement at said relatively high speed between the second attachment assembly and the tool holder assembly, the displacements controlled by the second and fourth drive means taking place in directions opposite to the displacement controlled by the first and third drive means.

4. Autonomous moving body according to claim 3, wherein the first and second drive means comprise two opposite racks carried by the first attachment assembly in accordance with said direction, and a first and a second pinion mounted on the tool holder assembly and respectively geared on the opposite racks, the third and fourth drive means incorporating two other opposite racks, carried by the second attachment assembly in accordance with said direction and a third and a fourth pinion mounted on the tool holder assembly and respectively geared on said other opposite racks, the motor member driving these four pinions at the same speed and in the same direction by movement transmission means incorporating the four clutches.

5. Autonomous moving body according to claim 4, wherein the transmission means comprise at least two belts driven by the motor member and passing over four pulleys supported by the tool holder assembly and driving respectively said pinions via four clutches.

6. Autonomous moving body according to claim 4, wherein the first and third pinions have identical diameters smaller than the diameters of the second and fourth pinions, which are also identical.

7. Autonomous moving body acording to claim 3, wherein the first attachment assembly comprises a rigid rectangular frame, whose short sides carry said attachment members and whose long sides carry the guidance means for the second attchment assembly and the tool holder assembly, the second attachment assembly also having a rigid rectangular frame, whereof two opposite sides cooperate with the guidance means of the first attachment assembly, the length of said opposite sides being less than the length of the long sides of the first attachment assembly.

8. Autonomous moving body according to claim 3, wherein the second attachment assembly has a part moving in accordance with said direction with respect to the first attachment assembly and a rotary part able to rotate with respect to the moving part about an axis perpendicular to said direction and to said surface, means being provided to control a relative rotation between said moving and rotary parts about said axis, said attachment members being supported by the rotary part.

9. Autonomous moving body according to claim 8, wherein the means for controlling the relative rotation incorporate a motor member carried by said moving part, a pinion driven by said motor member and a circular rack centered on said axis, carried by said rotary part and on which gears the pinion carried by the moving part.

* * * * *